United States Patent
Entrup

(12) 
(10) Patent No.: US 8,893,701 B1
(45) Date of Patent: Nov. 25, 2014

(54) BOW STABILIZER AND VIDEO CAMERA MOUNT SYSTEMS

(71) Applicant: Matthew Entrup, Quincy, IL (US)

(72) Inventor: Matthew Entrup, Quincy, IL (US)

( * ) Notice: Subject to any disclaimer, the term of this patent is extended or adjusted under 35 U.S.C. 154(b) by 0 days.

(21) Appl. No.: 14/054,723

(22) Filed: Oct. 15, 2013

Related U.S. Application Data

(63) Continuation-in-part of application No. 13/655,011, filed on Oct. 18, 2012, now abandoned.

(60) Provisional application No. 61/548,235, filed on Oct. 18, 2011.

(51) Int. Cl.
  *F41B 5/14* (2006.01)
  *F41B 5/20* (2006.01)
  *F41G 1/467* (2006.01)
  *G03B 29/00* (2006.01)

(52) U.S. Cl.
  CPC ............ *F41B 5/1426* (2013.01); *F41B 5/1403* (2013.01); *F41G 1/467* (2013.01); *F41B 5/1492* (2013.01); *G03B 29/00* (2013.01)
  USPC .................... 124/89; 124/86; 124/87; 124/88; 33/265

(58) Field of Classification Search
  CPC .... F41B 5/1492; F41B 5/1426; F41B 5/1403; F41G 1/467; G03B 29/00
  USPC .............................. 124/86, 87, 88, 89; 33/265
  See application file for complete search history.

(56) References Cited

U.S. PATENT DOCUMENTS

| | | | | |
|---|---|---|---|---|
| 4,296,725 A * | 10/1981 | Broderick | ...................... | 124/23.1 |
| 4,491,123 A * | 1/1985 | Wirtz | ................ | 124/89 |
| 4,643,159 A * | 2/1987 | Ryan | ................ | 124/88 |
| 4,788,961 A * | 12/1988 | Toth | ................ | 124/25.5 |
| 4,890,128 A * | 12/1989 | Kania | ................ | 396/426 |
| 5,273,022 A * | 12/1993 | Leven | ................ | 124/89 |
| 5,339,793 A * | 8/1994 | Findley | ................ | 124/89 |
| 6,286,796 B1* | 9/2001 | Pugliesi | ................ | 248/187.1 |
| 6,425,697 B1* | 7/2002 | Potts et al. | .......... | 396/426 |
| 6,556,245 B1* | 4/2003 | Holmberg | ................ | 348/333.01 |
| 7,604,420 B2* | 10/2009 | Moody et al. | ................ | 396/419 |
| 7,661,221 B2* | 2/2010 | Holmberg | ................ | 42/106 |
| 7,780,363 B1* | 8/2010 | Holmberg | ................ | 396/426 |
| 7,965,337 B2* | 6/2011 | Holmberg | ................ | 348/375 |
| 8,024,884 B2* | 9/2011 | Holmberg | ................ | 42/124 |
| 8,065,807 B2* | 11/2011 | Rucinski | ................ | 33/265 |
| 8,065,994 B2* | 11/2011 | Holmberg | ................ | 124/86 |
| 8,161,674 B2* | 4/2012 | Holmberg | ................ | 42/90 |
| 8,240,077 B2* | 8/2012 | Holmberg | ................ | 42/142 |

(Continued)

*Primary Examiner* — Gene Kim
*Assistant Examiner* — Alexander Niconovich
(74) *Attorney, Agent, or Firm* — RG Patent Consulting, LLC; Rachel Gilboy

(57) ABSTRACT

Bow stabilizer and video camera mount system is a dual-functioning bow stabilizer and camera-mounting unit to help reduce the noise and vibration produced when a bow is shot, to provide forward weight to help balance the bow when the hunter draws it back, and to record images when aiming the bow. Bow stabilizer and video camera mount system can also be used for both right- and left-handed bows by moving the external mounting platform to the desired side of the bow. Hunters can also use this device to position the video camera to the same side as the bow sights, making it easier to see the viewfinder of the camera than when using other devices. The unit includes a bow stabilizer rod, a dampening cover, and a horizontally rotatable camera mount.

19 Claims, 6 Drawing Sheets

(56) References Cited

U.S. PATENT DOCUMENTS

| | | | |
|---|---|---|---|
| 8,387,608 B2* | 3/2013 | Morris, II | 124/86 |
| 8,454,246 B2* | 6/2013 | Wood | 396/428 |
| 2007/0031142 A1* | 2/2007 | Moody et al. | 396/419 |
| 2007/0193570 A1* | 8/2007 | Lieb et al. | 124/86 |
| 2008/0267610 A1* | 10/2008 | Schofield | 396/421 |
| 2010/0043765 A1* | 2/2010 | Lang | 124/25.6 |
| 2010/0236535 A1* | 9/2010 | Rucinski | 124/87 |
| 2010/0236536 A1* | 9/2010 | Erickson | 124/88 |
| 2010/0272428 A1* | 10/2010 | Piltz | 396/428 |
| 2011/0249964 A1* | 10/2011 | Wood | 396/421 |
| 2011/0277737 A1* | 11/2011 | Morris, II | 124/25.6 |
| 2012/0073556 A1* | 3/2012 | Knowles | 124/88 |
| 2012/0151815 A1* | 6/2012 | Tate | 42/90 |
| 2012/0328279 A1* | 12/2012 | Raizman | 396/421 |
| 2013/0047972 A1* | 2/2013 | Walk et al. | 124/25.6 |
| 2013/0288743 A1* | 10/2013 | Hunt et al. | 455/556.1 |
| 2013/0340738 A1* | 12/2013 | Mancini, Ralph J. | 124/89 |

\* cited by examiner

BOW STABILIZER AND VIDEO CAMERA MOUNT SYSTEMS

CROSS-REFERENCE TO RELATED APPLICATION

The present application is a Continuation-in-Part (CIP) related to and claims priority from prior provisional application Ser. No. 61/548,235, filed Oct. 18, 2011 and pending non-provisional application Ser. No. 13/655,011 filed Oct. 18, 2012 which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of bow hunting and more specifically relates to compound bow stabilizer and video camera or cellular phone mount systems.

2. Description of the Related Art

Bow hunting is the practice of killing game animals by archery. In contrast to a rifle hunter who may shoot effectively from ranges in excess of 300 yards, archers usually restrict shots to a maximum of 80 yards. The distance depends upon individual ability, the target animal, the bow strength, terrain, arrow and weather. Most bows used for hunting have a minimum draw weight of 50 pounds-force. This is enough to hunt all but the very largest game. Arrows with mass more than 900 grains (58 g) penetrate better in large animals, so might be the bow hunter's choice when hunting these animals.

The closer proximity to game that the bow hunter must be to effectively hit the live target requires a considerable amount of skill and knowledge of the bow equipment. The hunter may walk along the ground slowly, looking for game and then stalking it carefully in the final approach in order to get close enough for a shot. The hunter may also wear camouflage to disguise his appearance, walk up wind to avoid letting the animal detect his human odor, and/or de-scent his body and clothes to further avoid detection. The more sophisticated his bow hunting equipment is, along with the other skills, the better his chances are to take game down.

Modern archers usually use compound bows which provide greater arrow speeds with less draw holding strength required. Other important pieces of equipment are bow silencers which silence the noise made from the string suddenly reaching the at rest position from the drawn position and stabilizers which provide balance and stability of aim at the moment of arrow release. Some devices cushion the vibration of the bow when fired, and consequently quiet the noise made from vibration when an arrow is released. Hunters often like to video record the hunt, but video recording a hunt usually requires more than one person, or the hunter must sacrifice stability and silencing in order to use the single threaded port provided for accessories that is on the front of standard designed compound bows. Videos and still shots of game taken during a hunt are often of poor quality. Multiple accessories are needed for the serious hunter but only one threaded accessory port is provided in typical bows. A better solution is desirable.

Various attempts have been made to solve the above-mentioned problems such as those found in U.S. Pat. Nos. 2010/0272428; 2007/0031142; 4,296,725; 6,425,697; 2010/0043765; and 2008/0267610. This art is representative of camera mount systems. None of the above inventions and patents, taken either singly or in combination, is seen to describe the invention as claimed.

Ideally, a bow stabilizer and video camera mount system should provide convenience and balance, and yet, would operate reliably and be manufactured at a modest expense. Thus, a need exists for a reliable bow stabilizer and video camera (and cellular phone) mount system to provide convenience of use while stabilizing and balancing a compound bow, and to avoid the above-mentioned problems.

BRIEF SUMMARY OF THE INVENTION

In view of the foregoing disadvantages inherent in the known camera mounts for hunting implement art, the present invention provides a novel (multi-purpose) bow stabilizer and video camera (and cellular phone) mount system. The general purpose of the present invention, which will be described subsequently in greater detail, is to provide convenience and versatility of use while stabilizing and balancing a compound bow.

A bow stabilizer and video camera mount system as disclosed herein, in a preferred embodiment, may comprise a bow stabilizer and video camera mount assembly (that is multi-purpose) having a bow stabilizer rod (having a first end and a second end), a dampening cover, and a camera mount (having a stabilizer end and a camera mount end). Alternate embodiments may comprising mounting means for a cellular phone. The first end of the bow stabilizer rod of the bow stabilizer and video camera mount assembly removably and threadably couples to the front side of a compound bow in preferred embodiments. The bow stabilizer and video camera mount assembly is positioned perpendicular to the front side of the compound bow.

The dampening cover comprises an inner volume and slideably envelopes the bow stabilizer rod and the stabilizer end of the camera mount removably couples to the second end of the bow stabilizer rod. The bow stabilizer rod may comprise ferrous metal but may comprise a composite material (or other suitably equivalent material) in other embodiments. A video camera threadably mounts to the camera mount end of the camera mount. Other suitable fastening means may be used, however threading is preferable.

An alternate embodiment for attaching and using a cellular phone as a video camera may have a cell phone mount assembly having a cradle member with a bottom side and a phone-cradle side, at least one phone-grip pad, an adjustable bar-hook, a threaded mounting orifice, and an offset arm mount having a proximate end and a distal end. The proximate end of the offset arm mount of the cell phone mount assembly is removably attachable to the second end of the bow stabilizer rod. The distal end of the offset arm mount is threadably couplable to the bottom side of the cradle member via the threaded mounting orifice located on the bottom side of the cradle member. The phone-grip pad(s) is/are non-removably attached to the phone-cradle side of the cradle member and prevent damage from occurring and also hold the phone firmly in place for use. The adjustable bar-hook is slideably and adjustably coupled to the front facing portion of the cradle member such that the adjustable bar-hook is able to grip the perimeter edge of a cellular phone.

The bow stabilizer and video camera mount assembly provides a weight such that the compound bow is substantially balanced forward to rear when the bow stabilizer and video camera mount assembly with the video camera is attached to produce a balanced and 'steady' focus when filming; this is desirable for producing a high quality recording of the event. The first end of the bow stabilizer rod further comprises a threaded rod having a thread-lock that may be a counter-acting nut. The first end of the bow stabilizer rod may have a male bolt thread that is about 5/16 inch in diameter having about 24 threads per inch in preferred embodiments. The second end of the bow stabilizer rod may further comprise a flat bar; the flat bar having a threaded orifice for threadably attaching the camera mount thereto.

The camera mount is able to be horizontally rotated such that the bow stabilizer and video camera mount assembly is useable by a left-handed or a right handed bow-user by lockably-positioning the video camera mount and video camera either to a left side or the right side of the vertically positioned compound bow. The camera mount end of the camera mount further may comprise a thumbwheel such that a mounted video camera is easily rotationally locked at a preferred angle for a bow-user. The thumbwheel may comprise a knurled periphery and a sizeable diameter for 'easy-gripping' without tools. The dampening cover is sound attenuating and vibration suppressible and may have a camouflage exterior pattern for hunting embodiments. The dampening cover is longitudinally compressible with an undulating exterior form. The dampening cover may also comprise rubber in a preferred embodiment; other embodiments may comprise suitable equivalents. The bow stabilizer and video camera mount assembly having the video camera mounted thereto, is useful for threadably attaching to the compound bow by a bow-user and videotaping a launched arrow at a target. The bow stabilizer and video camera mount system may comprise a kit having at least one stabilizer rod, at least one dampening cover, and at least one camera mount.

A method of use for the bow stabilizer and video camera mount system may also comprise the steps of threadably coupling a bow stabilizer and video camera mount assembly to a compound bow, mounting a video camera to the second end of the bow stabilizer rod of the bow stabilizer and video camera mount assembly, (optionally adjusting to a preferred angle), turning on the video camera to a record mode, launching-recording a flight path of an arrow fired from the compound bow, turning off the video camera, removing the video camera, and storing the compound bow with the attached bow stabilizer and video camera mount assembly for at least one future use.

The present invention holds significant improvements and serves as a bow stabilizer and video camera mount system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, bow stabilizer and video camera mount systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a camera mount for a hunting implement, and more particularly to a bow stabilizer and video camera mount system as used to improve the convenience and versatility of use in recording 'the hunt', yet while also stabilizing and balancing a compound bow.

Generally speaking, the bow stabilizer and video camera mount system can act as a dual-functioning bow stabilizer and camera-mounting unit to help reduce the noise and vibration produced when a bow is shot, to provide forward weight to help balance the bow when the hunter draws it back, and to record images when aiming the bow and releasing the arrow towards a live game target. Bow stabilizer and video camera mount system can also be used for both right- and left-handed bows by moving the external mounting platform to the desired side of the bow. Hunters can also use this device to position the video camera to the same side as the bow sights, making it easier to see the viewfinder of the camera than when using other devices. The device comprises a bow stabilizer rod, a dampening cover, and a horizontally rotatable camera mount.

Figure 1:
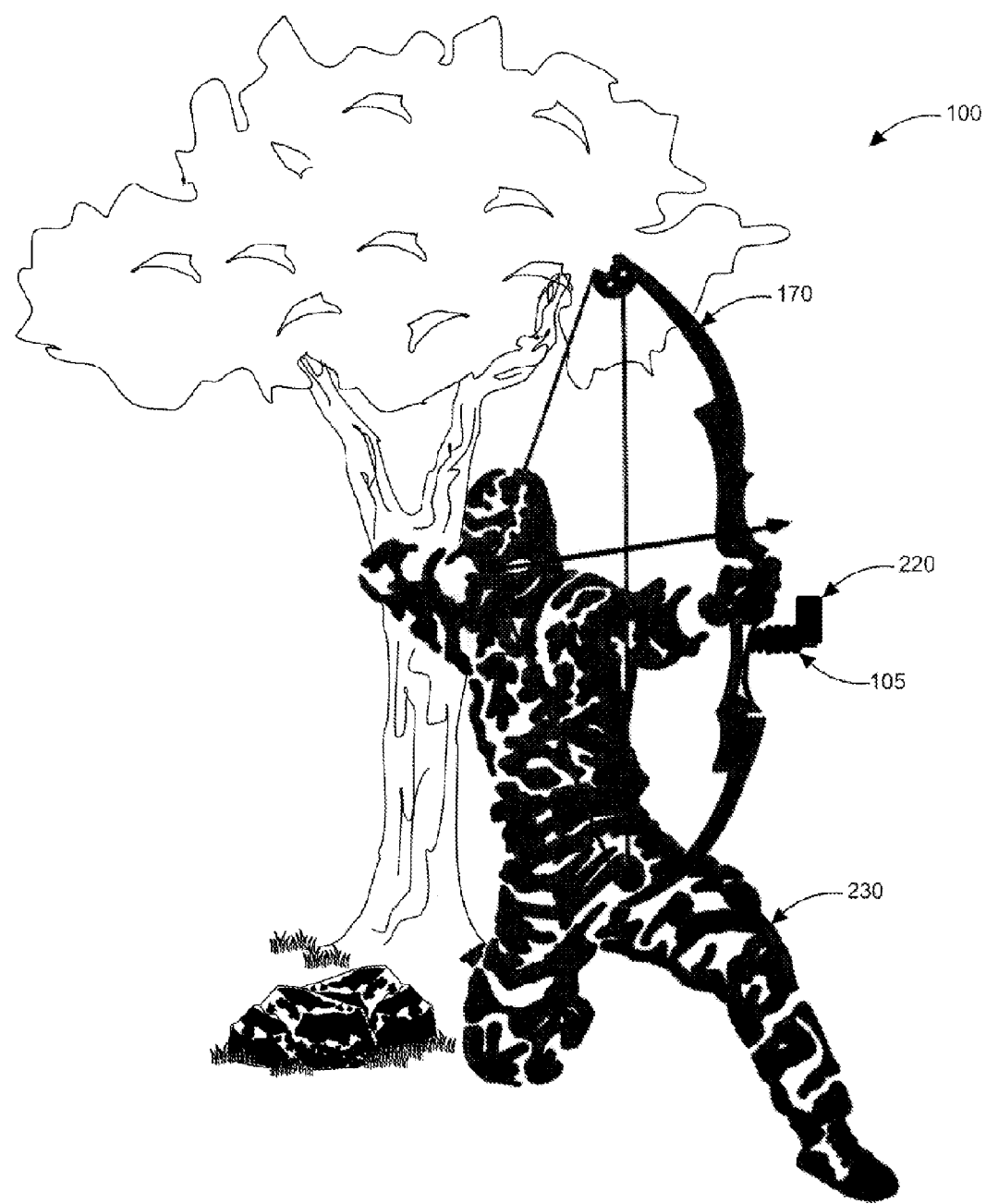
FIG. 1 shows a perspective view illustrating an in-use condition of bow stabilizer and video camera mount systems according to an embodiment of the present invention.

Referring to the drawings by numerals of reference there is shown in FIG. 1, a perspective view illustrating an in-use condition of bow stabilizer and video camera mount systems 100 according to an embodiment of the present invention.

Bow stabilizer and video camera mount systems 100 may comprise bow stabilizer and video camera mount assembly 105 having bow stabilizer rod 110 (having first end 112 and second end 114), dampening cover 120, and a camera mount 130 (having stabilizer end 140 and camera mount end 150). First end 112 of bow stabilizer rod 110 of bow stabilizer and video camera mount assembly 105 removably and threadably couples to front side 160 of compound bow 170. Bow stabilizer and video camera mount assembly 105 is positioned substantially perpendicular to front side 160 of compound bow 170. Dampening cover 120 comprises an inner volume and slideably envelopes bow stabilizer rod 110 and stabilizer end 140 of camera mount 130 removably coupled to second end 114 of bow stabilizer rod 110.

Figure 2:
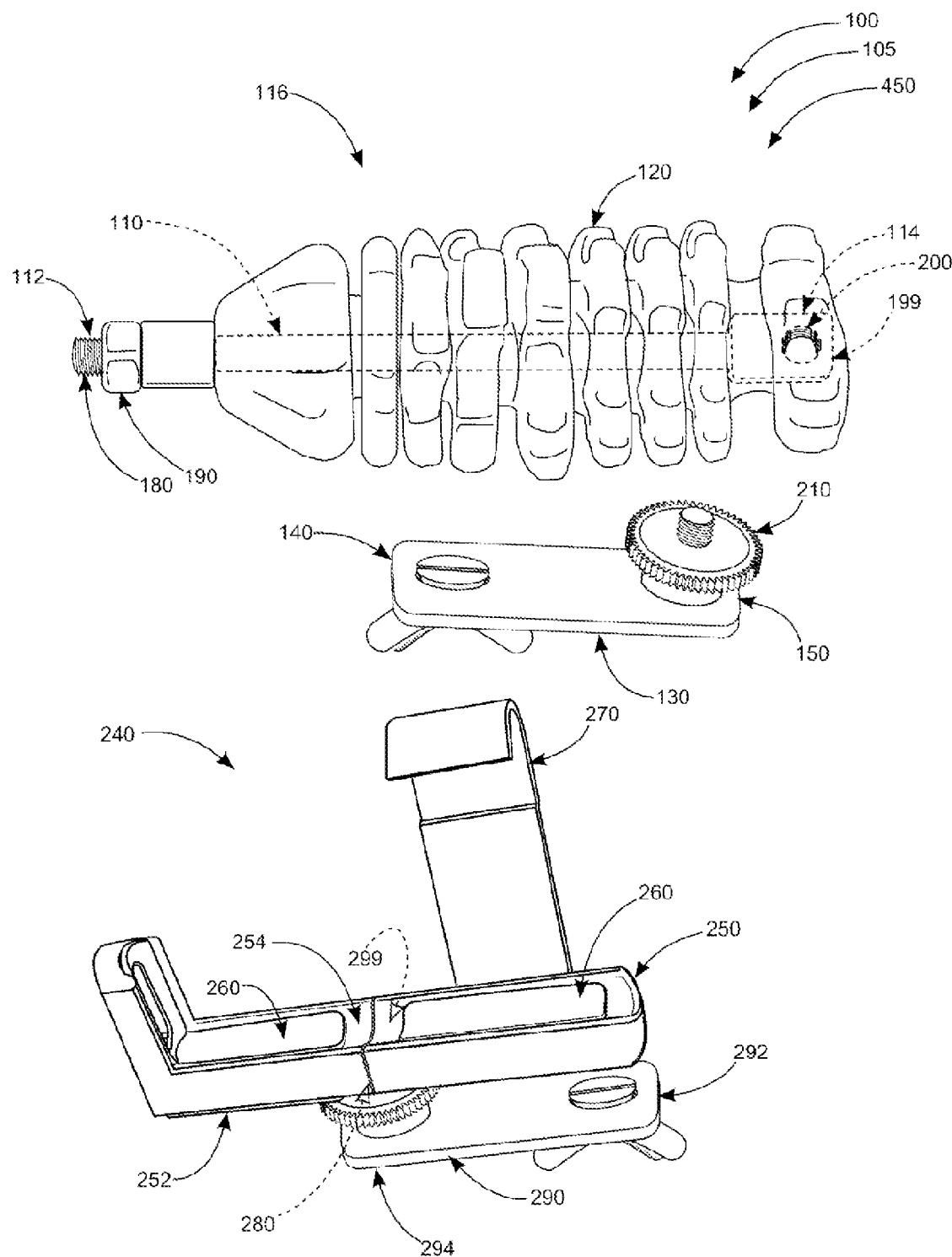
FIG. 2 is a perspective view illustrating a separated bow stabilizer and phone mount of the bow stabilizer and video camera mount system according to an alternate embodiment of the present invention of FIG. 1.

Referring now to FIG. 2, a perspective view illustrating separated bow stabilizer 116 and cell phone mount assembly 240 of bow stabilizer and video camera mount systems 100 according to an embodiment of the present invention of FIG. 1.

Bow stabilizer rod 110 may comprise ferrous metal but may comprise composite material(s) in other embodiments. First end 112 of bow stabilizer rod 110 further comprises threaded rod 180 having thread-lock 190 that may be a counter-acting nut. First end 112 of bow stabilizer rod 110 may have a male bolt thread that is about 5/16 inch in diameter having about 24 threads per inch; other sizes may be used in alternate embodiments. Second end 114 of bow stabilizer rod 110 may further comprise flat bar 199; flat bar 199 having threaded orifice 200 for threadably attaching camera mount 130 thereto. Flat bar 199 may have only a through hole and camera mount 130 may have a machine screw with a wing nut for fastening.

Camera mount end 150 of camera mount 130 further may comprise thumbwheel 210 such that a mounted video camera 220 is easily rotationally locked at a preferred angle for bow-user 230. Thumbwheel 210 may comprise a knurled periphery and a sizeable diameter for easy gripping means without use of tools. Dampening cover 120 is sound attenuating and vibration suppressible and may have a camouflage exterior pattern for hunting embodiments (to provide camouflaging means). Dampening cover 120 is longitudinally compressible with an undulating exterior form. Dampening cover 120 may also comprise rubber in a preferred embodiment.

An alternate embodiment for attaching and using a cell phone as video camera 220 may have cell phone mount assembly 240 having cradle member 250 with bottom side 252 and phone-cradle side 254, at least one phone-grip pad 260, adjustable bar-hook 270, threaded mounting orifice 280, and offset arm mount 290 having proximate end 292 and distal end 294. Proximate end 292 of offset arm mount 290 of cell phone mount assembly 240 is removably attachable to second end 114 of bow stabilizer rod 110. Distal end 294 of offset arm mount 290 is threadably couplable to bottom side 252 of cradle member 250 via threaded mounting orifice 280 located on bottom side 252 of cradle member 250. Phone-grip pad(s) 260 is/are non-removably attached to phone-cradle side 254 of cradle member 250. Adjustable bar-hook 270 is slideably and adjustably coupled to front facing portion 299 of cradle member 250 such that adjustable bar-hook 270 is able to grip the perimeter edge of a cell phone to prevent shaking and damage to/of the phone.

Figure 2A:
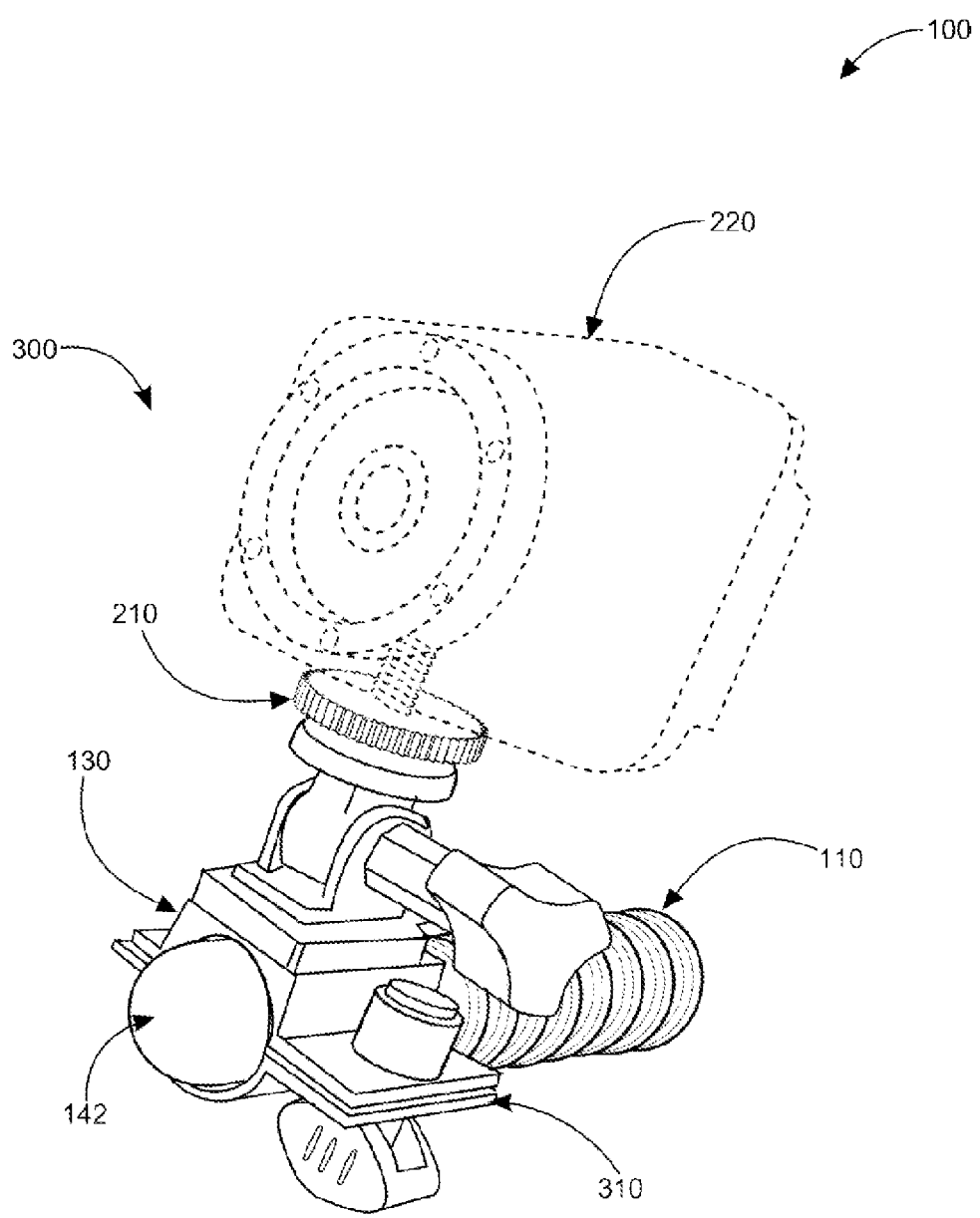
FIG. 2A is a perspective view illustrating an embodiment of the bow stabilizer and video camera mount system according to an embodiment of the present invention of FIG. 1.

FIG. 2A is a perspective view illustrating an embodiment of the bow stabilizer and video camera mount system 100 according to an embodiment of the present invention of FIG. 1.

Bow stabilizer and video camera mount assembly 105 may be used in combination with prior art. Bow stabilizer rod 110 may be cylindrical in shape and comprise threadably removable rounded cone-shaped end 142 allowing existing camera handlebar mount system 300 to be used with bow stabilizer rod 110. Clamp 310 may be sized to tightly grip rounded cone-shaped end 142 of bow stabilizer rod 110.

Figures 3, 3A:
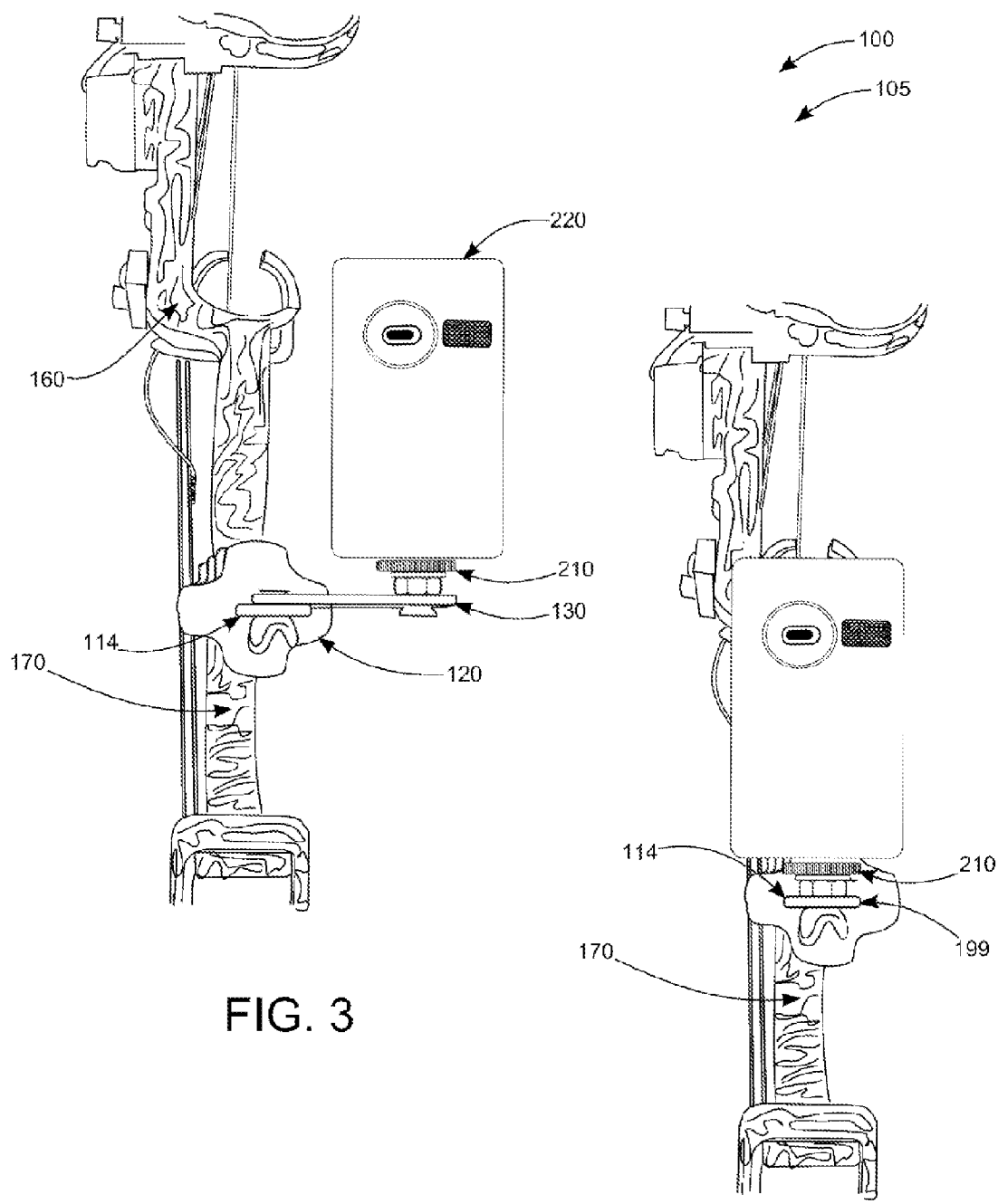
FIG. 3 is a perspective view illustrating a front view of a mounted video camera on the bow stabilizer and video camera mount system according to an embodiment of the present invention of FIG. 1.
FIG. 3A, is a perspective view illustrating a front view of a mounted video camera without the offset arm mount of the bow stabilizer and video camera mount system according to an embodiment of the present invention of FIG. 1.

Referring now to FIG. 3, a perspective view illustrating a front view of a mounted video camera 220 on bow stabilizer and video camera mount systems 100 according to an embodiment of the present invention of FIG. 1. FIG. 3A, is a perspective view illustrating a front view of a mounted video camera without the offset arm mount of the bow stabilizer and video camera mount system according to an embodiment of the present invention of FIG. 1.

Video camera 220 threadably mounts to camera mount end 150 of camera mount 130. Camera mount 130 is able to be horizontally rotated such that bow stabilizer and video camera mount assembly 105 is useable by a left-handed or a right handed bow-user 230 by lockably-positioning camera mount 130 and video camera 220 either to the left side or the right side of a vertically positioned compound bow 170. Speaking in general terms, the device basically comprises an internal metal bolt with an integrated flat metal platform at the opposite end of the mounting threads, and having a hole near the end of the flat platform to which an external camera-mounting unit can be attached and detached using a fastener such as a nut and bolt. A preferred embodiment uses thumbwheel 210 having a knurled edge so that tools are not required to attach or detach video camera 220, as previously mentioned. The internal metal bolt platform may be incased with a flexible, rubbery cylinder designed for easy compression and suppression of vibration and noise.

Figure 4:
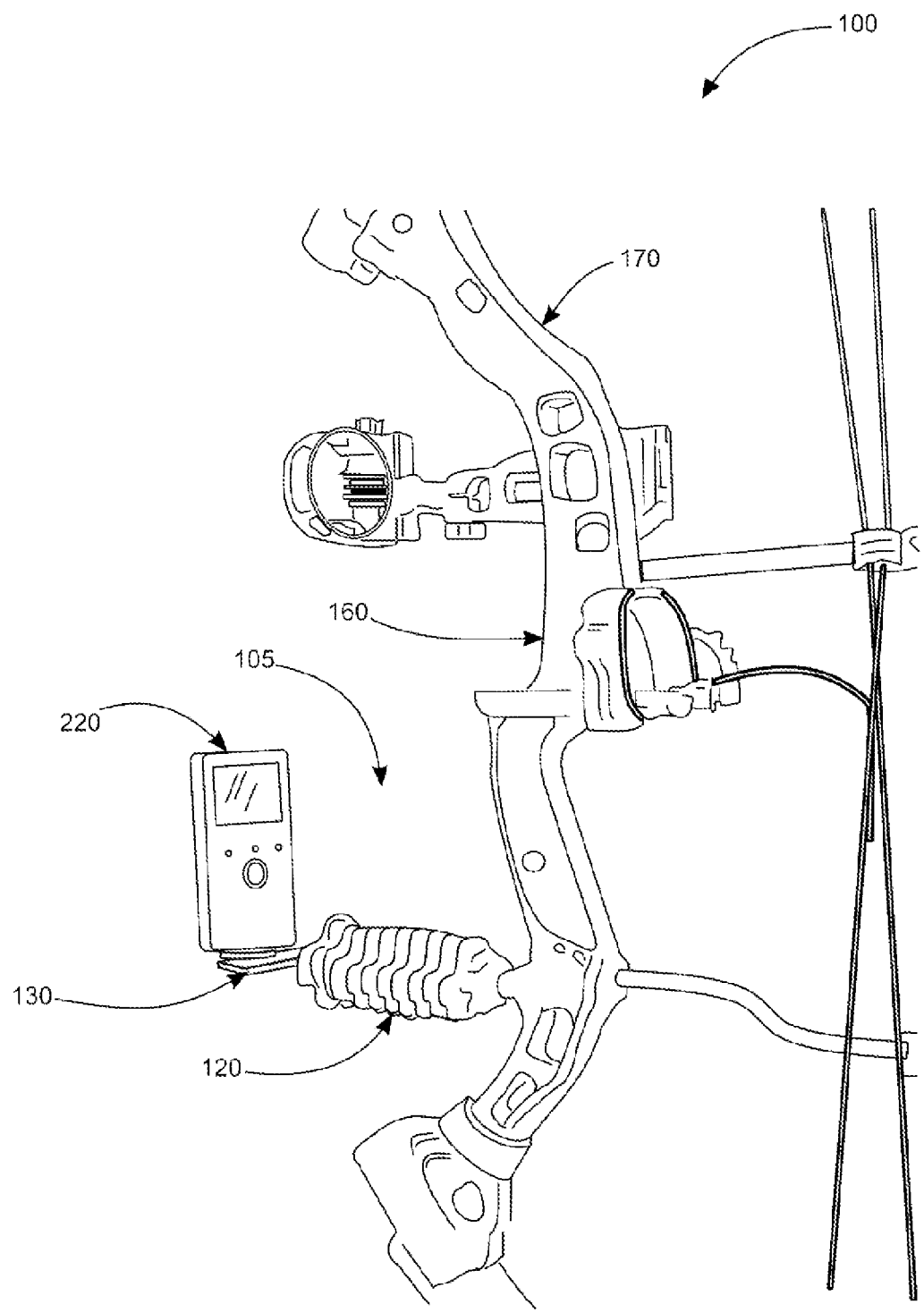
FIG. 4 is a side perspective view illustrating the bow stabilizer and video camera mount system according to an embodiment of the present invention of FIG. 1.

Referring now to FIG. 4, a side perspective view illustrating bow stabilizer and video camera mount systems 100 according to an embodiment of the present invention of FIG. 1.

Bow stabilizer and video camera mount assembly 105 provides a weight such that compound bow 170 is substantially balanced forward to rear when bow stabilizer and video camera mount assembly 105 with video camera 220 is attached to produce a balanced and steady focus when filming. Bow stabilizer and video camera mount assembly 105 having video camera 220 mounted thereto, is useful for threadably attaching to compound bow 170 by bow-user 230 and videotaping a launched arrow at a target (live game). The flexible, rubbery cylinder (dampening cover 120) that incases bow stabilizer rod 110 can be compressed and slid back, exposing the internal attachment platform (second end 114) to which the external mounting platform (camera mount end 150) can be attached. The entire apparatus can be screwed into the bow's riser and then secured with a locking nut, so that camera mount 130 is perpendicular to the riser of the bow, assuring video camera 220 visual angle will be parallel to the arrow when compound bow 170 is being aimed.

Bow stabilizer and video camera mount systems 100 may be sold as kit 450 comprising the following parts: at least one stabilizer rod; at least one dampening cover; at least one camera mount; and at least one set of user instructions. Bow stabilizer and video camera mount systems 100 may be manufactured and provided for sale in a wide variety of sizes, shapes and weights for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, cameras, video cameras, various fasteners, etc., may be sufficient.

Figure 5:
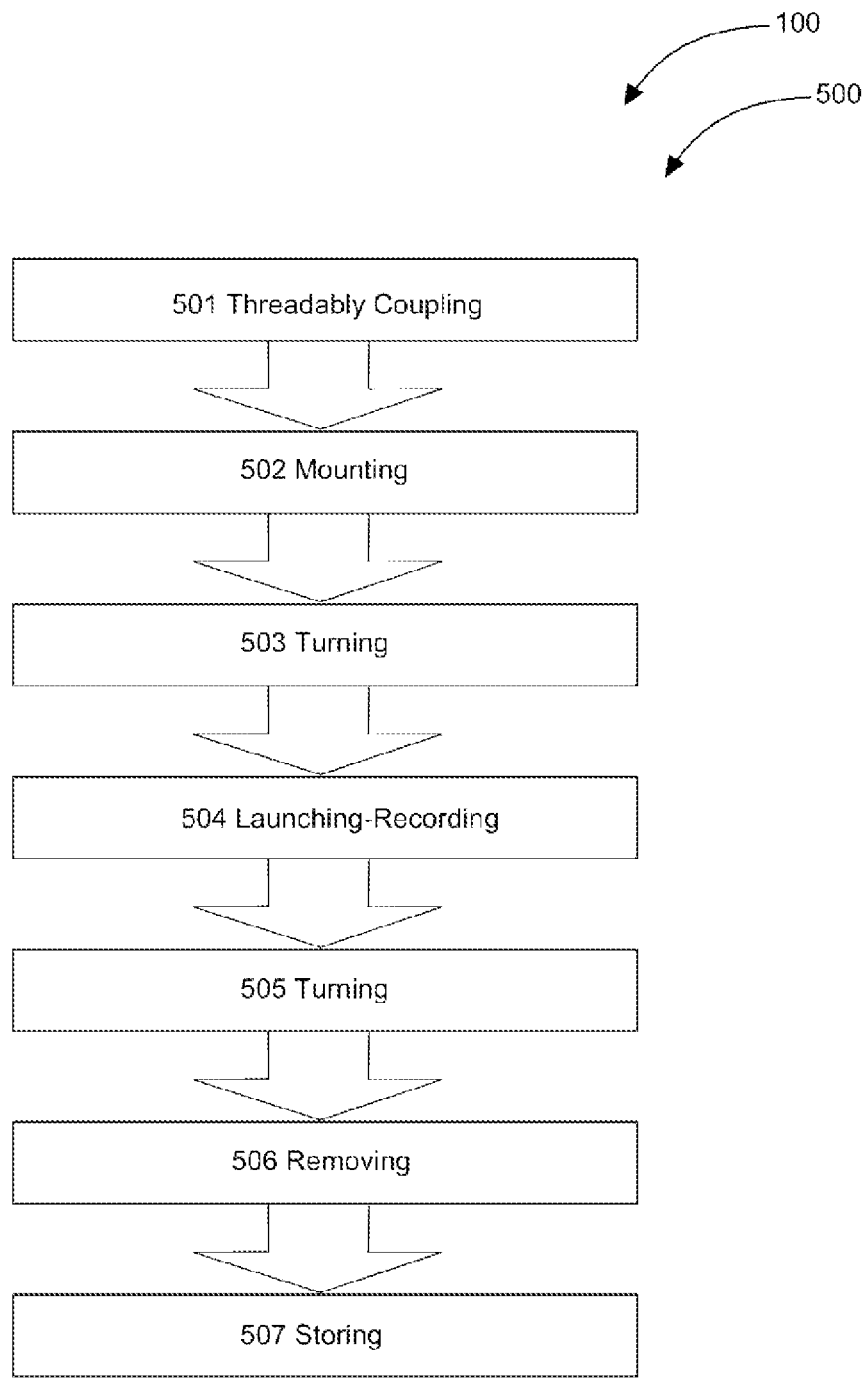
FIG. 5 is a flowchart illustrating a method of use for the bow stabilizer and video camera mount system according to an embodiment of the present invention of FIGS. 1-4.

Referring now to FIG. 5, a flowchart illustrating method of use 500 for bow stabilizer and video camera mount systems 100 according to an embodiment of the present invention of FIGS. 1-4.

A method of use for bow stabilizer and video camera mount systems 100 may comprise the steps of: step one 501, threadably coupling bow stabilizer and video camera mount assembly 105 to compound bow 170; step two 502, mounting video camera 220 (or phone) to second end 114 of bow stabilizer rod 110 of bow stabilizer and video camera mount assembly 105; step three 503, turning on video camera 220 (or phone) to a record mode; step four 504, launching-recording the flight path of an arrow fired from compound bow 170; step five 505, turning off video camera 220 (or phone); step six 506, removing video camera 220 (or phone); and step seven 507, storing compound bow 170 with the attached bow stabilizer and video camera mount assembly 105.

It should be noted that steps 503, 504, and 505, are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A bow stabilizer and video camera mount system comprising:
    a bow stabilizer and video camera mount assembly having;
        a bow stabilizer rod having a first end and a second end;
        a dampening cover;
        a camera mount having;
            a stabilizer end; and
            a camera mount end;
        a cell phone mount assembly having;
            a cradle member having;
                a bottom side and a phone-cradle side;
                at least one phone-grip pad;
                an adjustable bar-hook;
                a threaded mounting orifice; and
                an offset arm mount having;
                    a proximate end; and
                    a distal end;

wherein said first end of said bow stabilizer rod of said bow stabilizer and video camera mount assembly removably and threadably couples to a front side of a compound bow;
    wherein said dampening cover further comprises an inner volume and wherein said dampening cover slideably envelopes said bow stabilizer rod;
    wherein said stabilizer end of said camera mount removably couples to said second end of said bow stabilizer rod;
    wherein a video camera threadably mounts to said camera mount end of said camera mount;
    wherein said proximate end of said offset arm mount of said cell phone mount assembly is removably attachable to said second end of said bow stabilizer rod;
    wherein said distal end of said offset arm mount is threadably couplable to said bottom side of said cradle member via said threaded mounting orifice located on said bottom side of said cradle member;
    wherein said at least one phone-grip pad is non-removably attached to said phone-cradle side of said cradle member;
    wherein said adjustable bar-hook is slideably and adjustably coupled to a front portion of said cradle member such that said adjustable bar-hook is able to grip a perimeter edge of a cell phone;
    wherein said bow stabilizer and video camera mount assembly, having said video camera mounted thereto and alternately said cell phone mount assembly, is useful for threadably attaching to said compound bow by a bow-user and videotaping a launched arrow at a target.

2. The bow stabilizer and video camera mount system of claim 1 wherein said first end of said bow stabilizer rod further comprises a threaded rod having a thread-lock.

3. The bow stabilizer and video camera mount system of claim 2 wherein said second end of said bow stabilizer rod further comprises a flat bar, said flat bar having a threaded orifice for threadably attaching said camera mount thereto.

4. The bow stabilizer and video camera mount system of claim 3 wherein said camera mount is able to be horizontally rotated such that said bow stabilizer and video camera mount assembly is useable by a left-handed and alternately a right handed said bow-user.

5. The bow stabilizer and video camera mount system of claim 1 wherein said dampening cover is sound attenuating.

6. The bow stabilizer and video camera mount system of claim 5 wherein said dampening cover comprises a camouflage exterior pattern.

7. The bow stabilizer and video camera mount system of claim 6 wherein said dampening cover is longitudinally compressible.

8. The bow stabilizer and video camera mount system of claim 4 wherein said camera mount end of said camera mount further comprises a thumbwheel such that a mounted said video camera is easily rotationally locked at a preferred angle for said bow-user.

9. The bow stabilizer and video camera mount system of claim 5 wherein said dampening cover is vibration suppressible.

10. The bow stabilizer and video camera mount system of claim 2 wherein said bow stabilizer rod comprises ferrous metal.

11. The bow stabilizer and video camera mount system of claim 1 wherein said bow stabilizer and video camera mount assembly is positioned perpendicular to said front side of said compound bow.

12. The bow stabilizer and video camera mount system of claim 5 wherein said dampening cover comprises an undulating exterior form.

13. The bow stabilizer and video camera mount system of claim 12 wherein said dampening cover comprises rubber.

14. The bow stabilizer and video camera mount system of claim 1 wherein said bow stabilizer and video camera mount assembly provides a weight such that said compound bow is substantially balanced forward to rear when said bow stabilizer and video camera mount assembly with said video camera is attached to produce a balanced and steady focus when filming.

15. The bow stabilizer and video camera mount system of claim 1 wherein said thumbwheel comprises a knurled periphery.

16. The bow stabilizer and video camera mount system of claim 1 wherein said first end of said bow stabilizer rod comprises male bolt threads that are about 5/16 inch in diameter having about 24 threads per inch.

17. The bow stabilizer and video camera mount system of claim 4 wherein said camera mount is able to lockably-position said video camera to a left side and alternately to a right side of a vertically positioned said compound bow.

18. A bow stabilizer and video camera mount system comprising:
   a bow stabilizer and video camera mount assembly having;
      a bow stabilizer rod having a first end and a second end;
      a dampening cover;
      a camera mount having;
         a stabilizer end; and
         a camera mount end;
   wherein said first end of said bow stabilizer rod of said bow stabilizer and video camera mount assembly removably and threadably couples to a front side of a compound bow;
   wherein said bow stabilizer and video camera mount assembly is positioned perpendicular to said front side of said compound bow;
   wherein said dampening cover further comprises an inner volume and wherein said dampening cover slideably envelopes said bow stabilizer rod;
   wherein said stabilizer end of said camera mount removably couples to said second end of said bow stabilizer rod;
   wherein said bow stabilizer rod comprises ferrous metal;
   wherein a video camera threadably mounts to said camera mount end of said camera mount;
   wherein said bow stabilizer and video camera mount assembly provides a weight such that said compound bow is substantially balanced forward to rear when said bow stabilizer and video camera mount assembly with said video camera is attached to produce a balanced and steady focus when filming;
   wherein said first end of said bow stabilizer rod further comprises a threaded rod having a thread-lock;
   wherein said first end of said bow stabilizer rod comprises male bolt threads that are about 5/16 inch in diameter having about 24 threads per inch;
   wherein said second end of said bow stabilizer rod further comprises a flat bar, said flat bar having a threaded orifice for threadably attaching said camera mount thereto;
   wherein said camera mount is able to be horizontally rotated such that said bow stabilizer and video camera mount assembly is useable by a left-handed and alternately a right handed said bow-user;
   wherein said camera mount is able to lockably-position said video camera to a left side and alternately to a right side of a vertically positioned said compound bow;
   wherein said camera mount end of said camera mount further comprises a thumbwheel such that a mounted said video camera is easily rotationally locked at a preferred angle for said bow-user;
   wherein said thumbwheel comprises a knurled periphery;
   wherein said dampening cover is sound attenuating;
   wherein said dampening cover is vibration suppressible;
   wherein said dampening cover comprises a camouflage exterior pattern;
   wherein said dampening cover is longitudinally compressible;
   wherein said dampening cover comprises an undulating exterior form;
   wherein said dampening cover comprises rubber; and
   wherein said bow stabilizer and video camera mount assembly, having said video camera mounted thereto, is useful for threadably attaching to said compound bow by a bow-user and videotaping a launched arrow at a target.

19. The system of claim 18 further comprising a kit having;
   at least one said stabilizer rod;
   at least one said dampening cover; and
   at least one said camera mount.

* * * * *